United States Patent [19]

Gobbers et al.

[11] Patent Number: 5,573,358
[45] Date of Patent: Nov. 12, 1996

[54] DUAL TOOL-CARRIER FOR HAND DRILLS

[76] Inventors: Walter Gobbers, Hirschhaldestr. 3, 89542 Herbrechtingen; Dieter Gobbers, Steigstr. 49, 89520 Heidenheim, both of Germany

[21] Appl. No.: 302,171

[22] Filed: Sep. 8, 1994

[30] Foreign Application Priority Data

Sep. 9, 1993 [DE] Germany .............................. 9313602 U

[51] Int. Cl.⁶ ..................................................... B23B 45/00
[52] U.S. Cl. ................. 408/35; 7/165; 81/57.22; 279/14; 408/239 R
[58] Field of Search ................................. 408/20, 35, 124, 408/238, 239 R; 279/14; 7/158, 165; 81/57.22, 57.23; 173/46

[56] References Cited

U.S. PATENT DOCUMENTS

| | | | |
|---|---|---|---|
| 2,303,565 | 12/1942 | Luna | 81/57.22 |
| 2,679,770 | 6/1954 | Carter et al. | 408/35 |
| 4,604,005 | 8/1986 | Russ | 408/35 |
| 5,022,131 | 6/1991 | Hobbs | 408/35 |
| 5,149,230 | 9/1992 | Nett | 7/165 |

FOREIGN PATENT DOCUMENTS

| | | | |
|---|---|---|---|
| 611615 | 1/1961 | Canada | 408/35 |
| 3831132 | 6/1989 | Germany . | |

*Primary Examiner*—Daniel W. Howell
*Attorney, Agent, or Firm*—George Pappas

[57] ABSTRACT

The invention relates to a dual tool-carrier for hand drills with the following features: two shafts are provided each for mounting one tool e.g. drill chuck, screw attachment etc.;

the shafts form an angle with one another which swivels the tool not being used out of the working area;

a fixture is provided, said fixture frictionally connects alternately the axes with the driving shaft of the drill. The invention is characterized by the following features:

the shafts and the driving shafts of the drill form a plane;

the two shafts are provided and can be rotated about an axis vertical to said plane;

a driver is provided connected to the driving shaft fixed in their rotational movement;

a bell-shaped sleeve is provided, said bell-shaped sleeve is firmly connected to the machine housing;

a swivel bearing is provided driven by the bell-shaped sleeve;

the two shafts are supported in the swivel bearing;

at least one coulisse guide is provided for the swivel bearing, said coulisse bearing guides the swivel movement of the swivel bearing so that the respective shaft in the operating position is connected to the drive fixed in their rotational movement;

a mechanical catch is provided, said catch prevents unintentional swivelling of the swivel bearing.

8 Claims, 21 Drawing Sheets

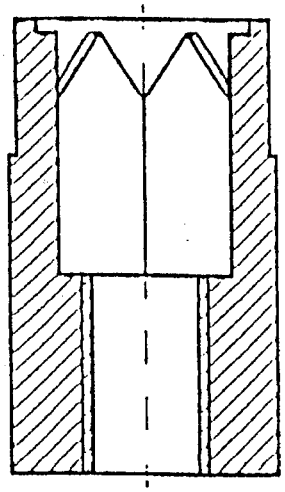
FIG_12a
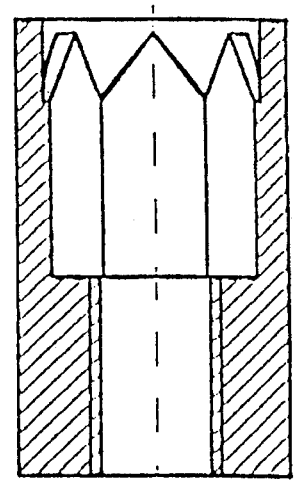
FIG_12d
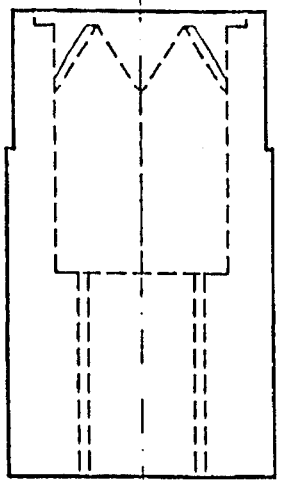
FIG_12b
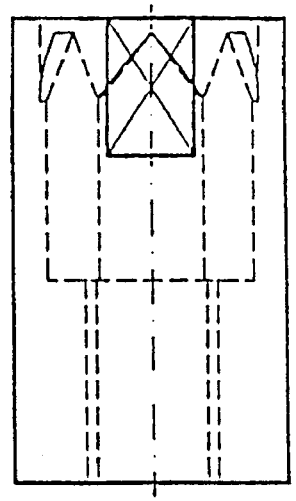
FIG_12e
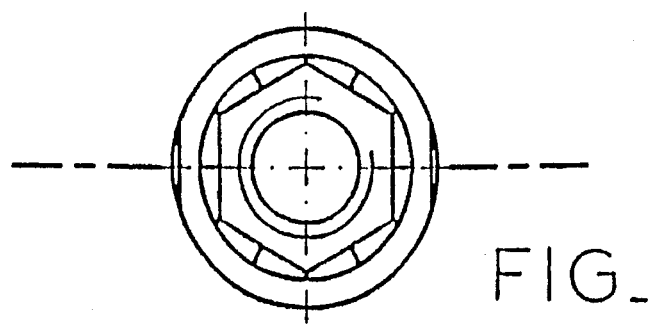
FIG_12c

DUAL TOOL-CARRIER FOR HAND DRILLS

TECHNICAL FIELD

The invention relates to a dual tool-carrier for hand drills.

BACKGROUND OF THE INVENTION

A known dual tool-carrier illustrated in DE-OS 38 31 132 A1. This dual tool-carrier consists of a main body, said main body holds a pivoted, 90° truncated cone inclined at 45° to the machine axis, said truncated cone supports three tool holding fixtures positioned at 120° intervals star shaped and at right angles to the truncated cone surface area.

What is disadvantageous with this state-of the art is that the design can only be effected with a spur gear and is thus expensive and costly in manufacture. U.S. Pat. No. 5,149,230 illustrates and describes a dual tool-carrier for hand drills. There are two shafts provided which are flush to one another and which can be pivoted together about one axis.

SUMMARY OF THE INVENTION

It is the object of the present invention to illustrate a dual tool-carder which on the one hand is economic to manufacture and on the other with regards weight is light in design and thus during handling does not provide too great an additional weight load to the hand drill.

The problem is solved in that a dual tool-carrier is proposed for holding two tools, said dual tool-carrier connects one or the other tool with the drive shaft of the hand drill fixed in their rotational movements by simple moving or rotating of the individual holder along a coulisse or about a pivot. The dual tool-carrier embodiment of the invention will be shown in the following in the accompanying drawings.

BRIEF DESCRIPTION OF THE DRAWINGS

FIG. 12a is a cross sectional front elevation view of the driver taken along line a-b of FIGS. 12c and constructed in accordance with the principles of the present invention;

FIG. 12b is a front elevation view of the driver shown in FIG. 12a;

FIG. 12c is a top plan view of the driver shown in figure 12b;

FIG. 12d is a cross sectional side elevation view of the driver shown in 12b taken along line c-d;

FIG. 12e is a side elevation view of the driver shown in FIG. 12b;

DESCRIPTION OF A SPECIFIC EMBODIMENT

FIGS. 1 to 11 illustrate an embodiment of the invention of a dual tool-carrier with two driven shafts which are coupled alternately by swivelling to the driving shaft of the drill. Whereby in this example, a drill chuck drawn by a dotted line is joined to the shaft, whereas on the other shaft an insert is provided for a screw attachment.

Figure 1:
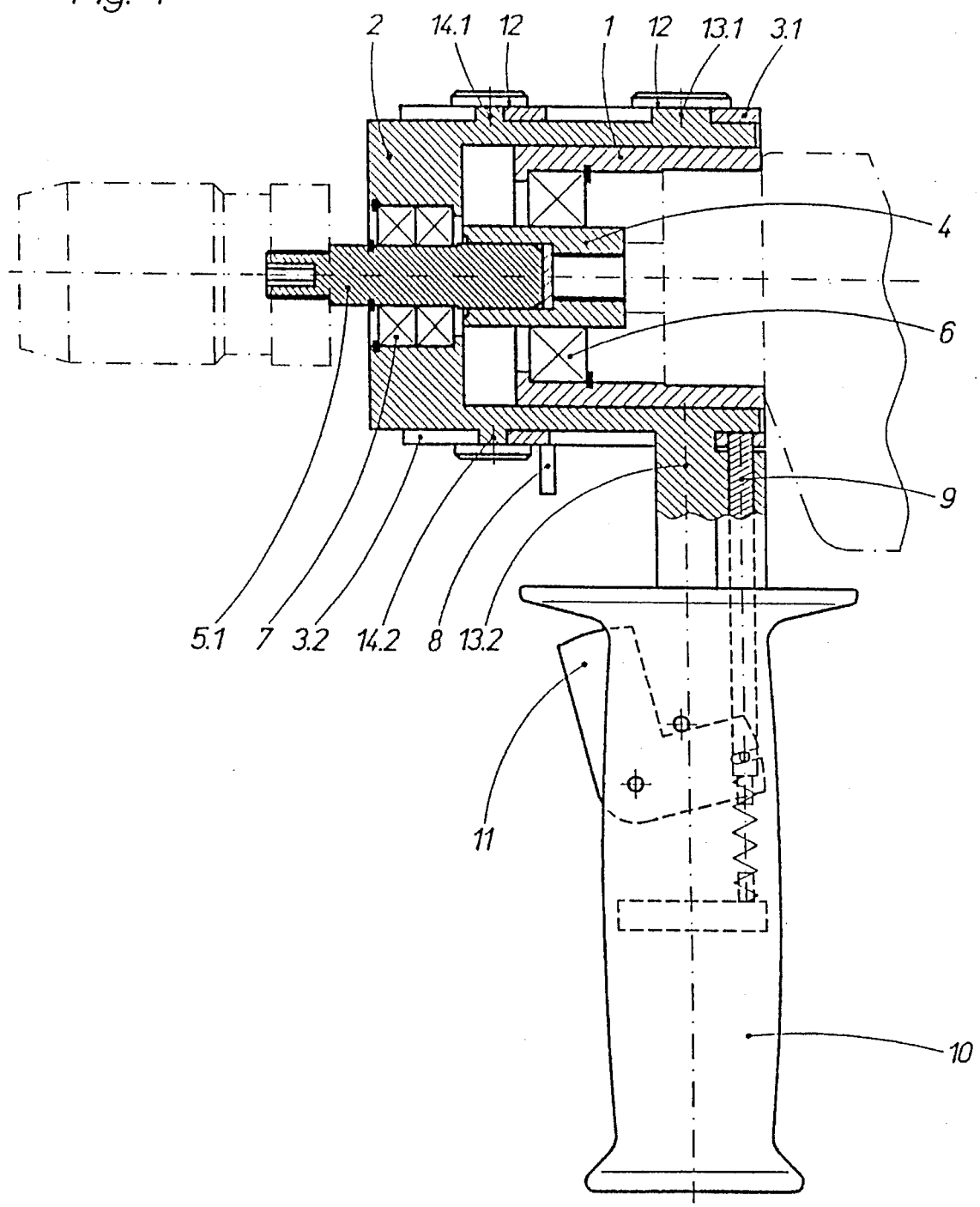
FIG. 1 is a side elevational view of a preferred embodiment of the dual tool-carrier, partly in cross section along a central vertical plane, and showing the driver 4 connected to the shaft 5.1.

FIG. 1 illustrates the embodiment of the invention in cross section along a central vertical plane. In the centre the bell-shaped sleeve of the dual tool-carrier can be seen which produces the direct connection to the drill (drawn with dotted line). This can take place via attachment screws in the case of a variable attachment or integrated in the actual drill if the dual tool-carrier is not intended to be removed. In the front area of the bell-shaped sleeve a bearing 6 is provided, said bearing pivots the driver 4, said driver is connected to the driving shaft of the drill. In the driver in the illustrated example the actual shaft 5.1 is displayed inserted. This means the shaft is connected to the driver both frictionally with regard to the rotation, as well as inserted so that the impact effect of an impact drilling machine can be transferred to the shaft 5.1. The shaft for its part is supported by the swivel bearing 2 via a bearing 7 whereby the guide of the shaft is so formed that an axial play enables it to transfer the impact drill effect without damaging the bearing. The swivel bearing 2 itself sits on the bell-shaped sleeve 1 and has two pairs of pins 14.1, 14.2 and 13.1 13.2 top and bottom respectively, said pins engage into sparings of the coulisse at the top and bottom, said coulisse arranged above the swivel bearing. The sparings of the coulisse 3.1, as can be seen in FIGS. 6–11, are so formed that a swivelling of the swivel bearing from the operation of shaft 5.1 to the operation of shaft 5.2 takes place so that first an axial forwards movement of the swivel bearing is carried out, whereby a decoupling of the shaft in operation 5.1 or 5.2 respectively is carried out, then a sidewards swivel motion takes place guided by the coulisse about approx. 90°, whereby the shaft which was not in operation heretofore is superimposed axially with the driver and then again an axial reverse movement of the swivel bearing, whereby the new shaft is inserted into the driver at least fixed in their rotational movement.

Figure 2:
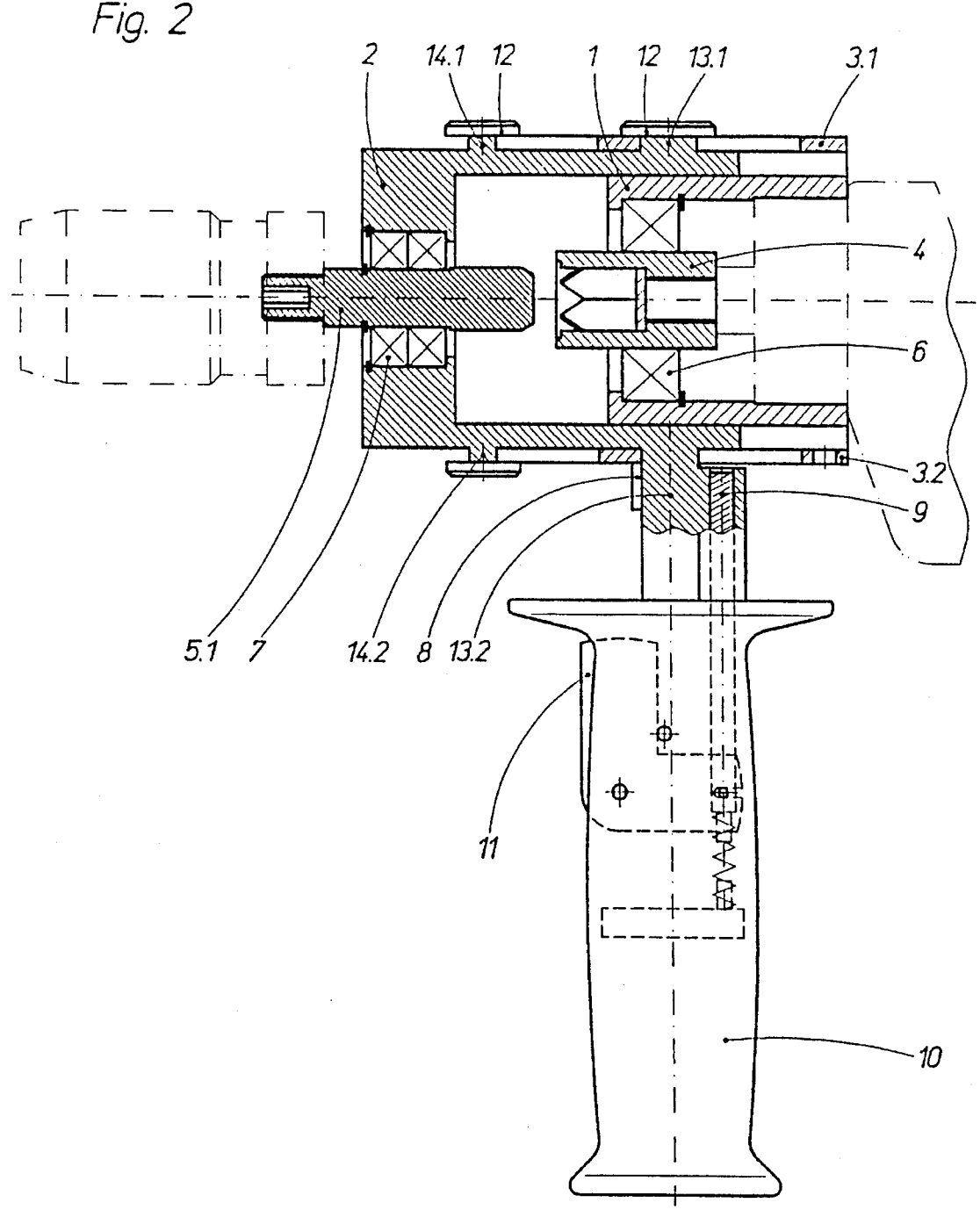
FIG. 2 is a side elevational view similar to FIG. 1, however, with the driver 4 disconnected from shaft 5.1.
Figure 3:
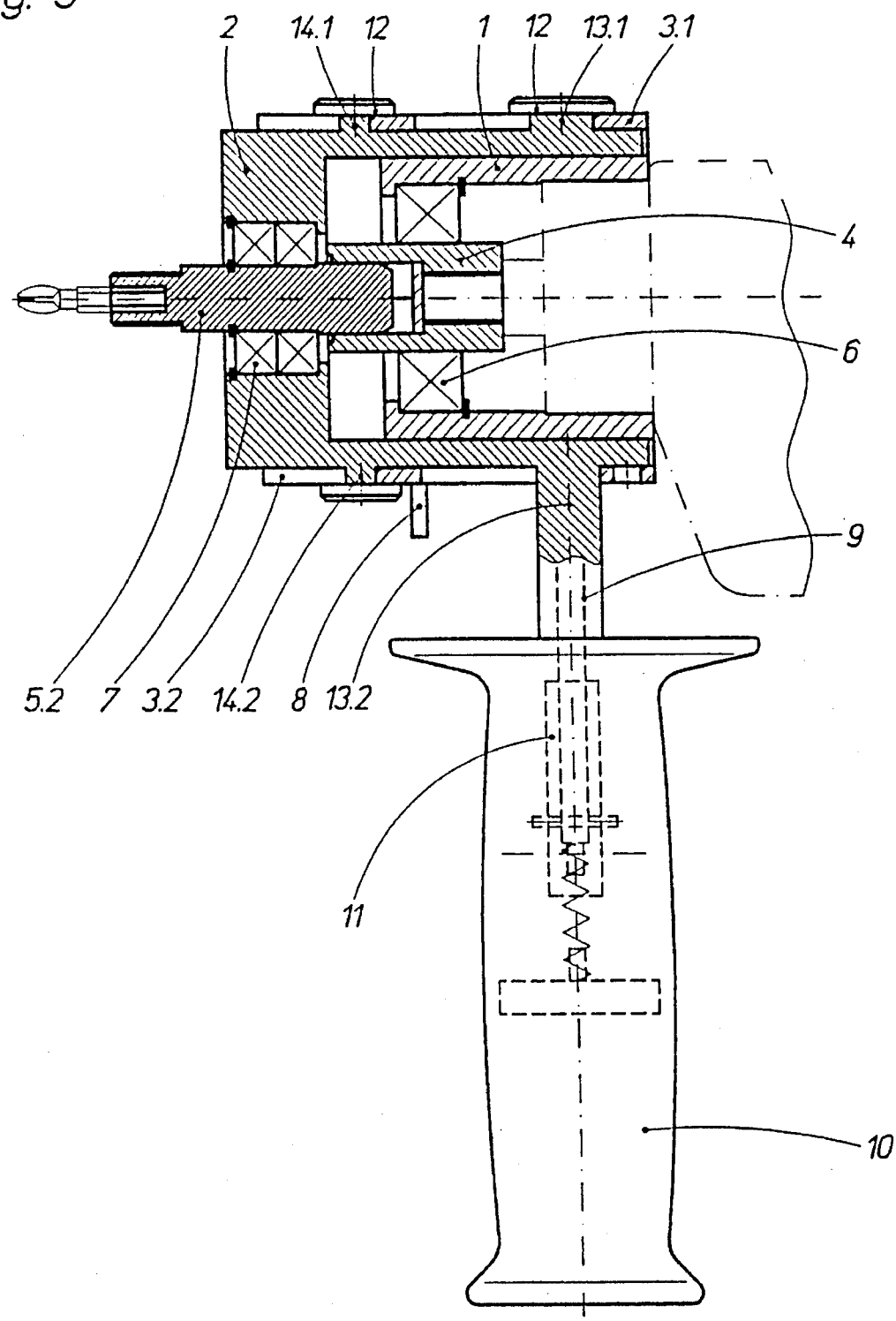
FIG. 3 is a side elevational view similar to FIG. 1 with driver 4 engaging a shaft 5.2 of a different configuration.

FIG. 2 illustrates the situation of the swivel bearing pushed forwards so that a free space arises between shaft 5.1 and the driver 4, while FIG. 3 represents the new end situation in which shaft 5.2 is inserted in the driver. In the example of FIG. 3 it can be clearly seen that shaft 5.2 on the side of the driver is designed shorter than shaft 5.1 so that in this area a play arises whereby, even with the impact drilling function of the impact drill switched on, no impact effect can be transferred to shaft 5.2. At the same time shaft 5.2 is also designed in axial direction without play relative to its beating so that no axial movement of shaft 5.2 occurs during operation.

In FIGS. 1–3 a hand grip is also illustrated which is attached in the extension of the pin 13.2 whereby in the hand grip 10 a finger-operated lever 11 is provided which moves a plunger pin 9 up and down and due to a corresponding borehole in the coulisse causes the plunging pin to engage in the couslisse in the desired operating positions. With the help of this hand grip it is very easy to carry out the swivel movement of the swivel bearing described above without the operator having to remove his hand from the machine. This means that first the swivel bearing must be disengaged via the hand grip, then an axial forwards movement with subsequent swivel movement and following this again axial reverse movement and. subsequent release of the lever 11, whereby again the plunger pin 9 engages and fixes the swivel bearing so that the machine connected with the dual tool-carrier is again ready for operation.

Figure 4:
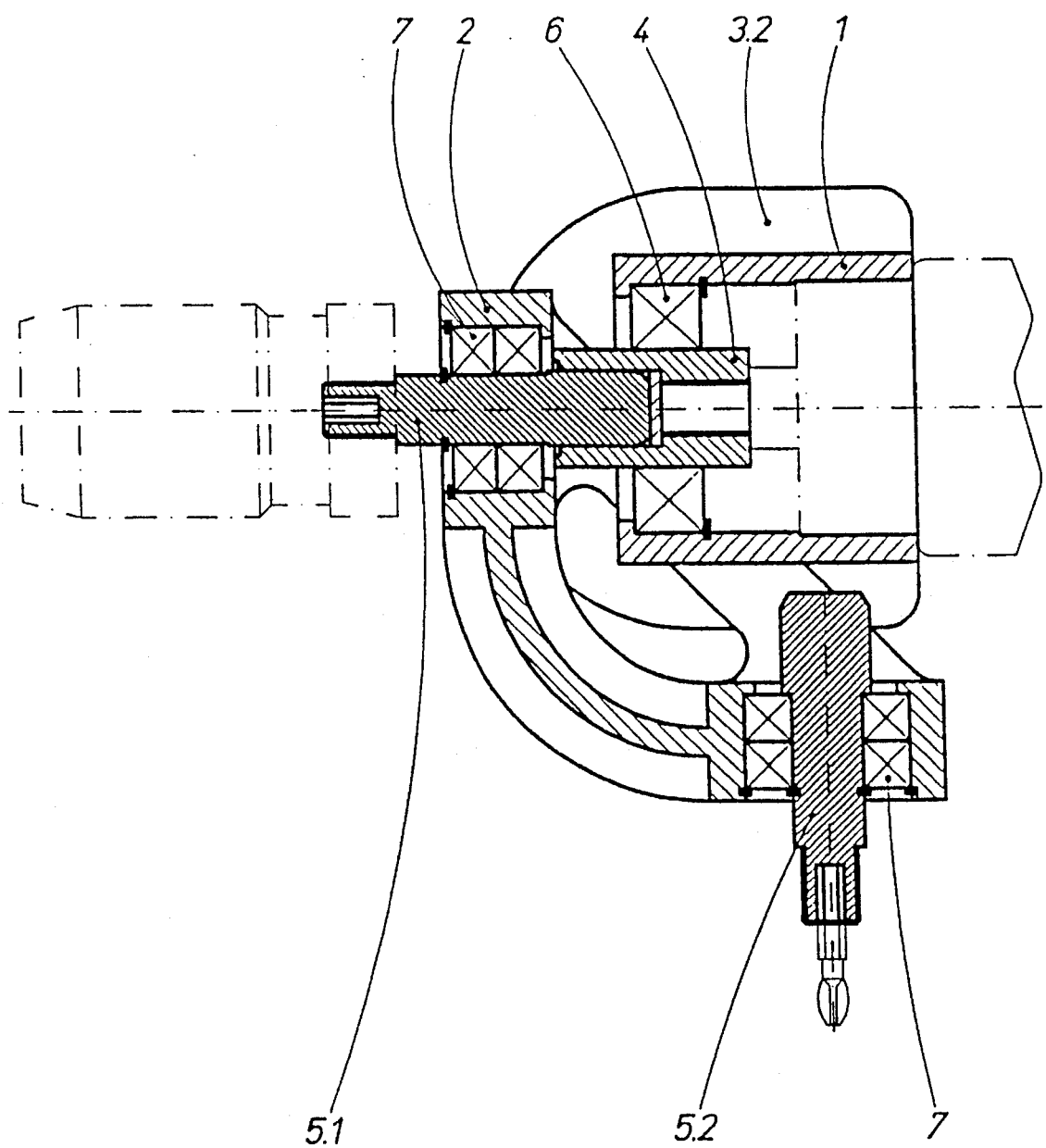
FIG. 4 is a top plan sectional view of the swivel bearing corresponding to the operating position of FIG. 1.
Figure 5:
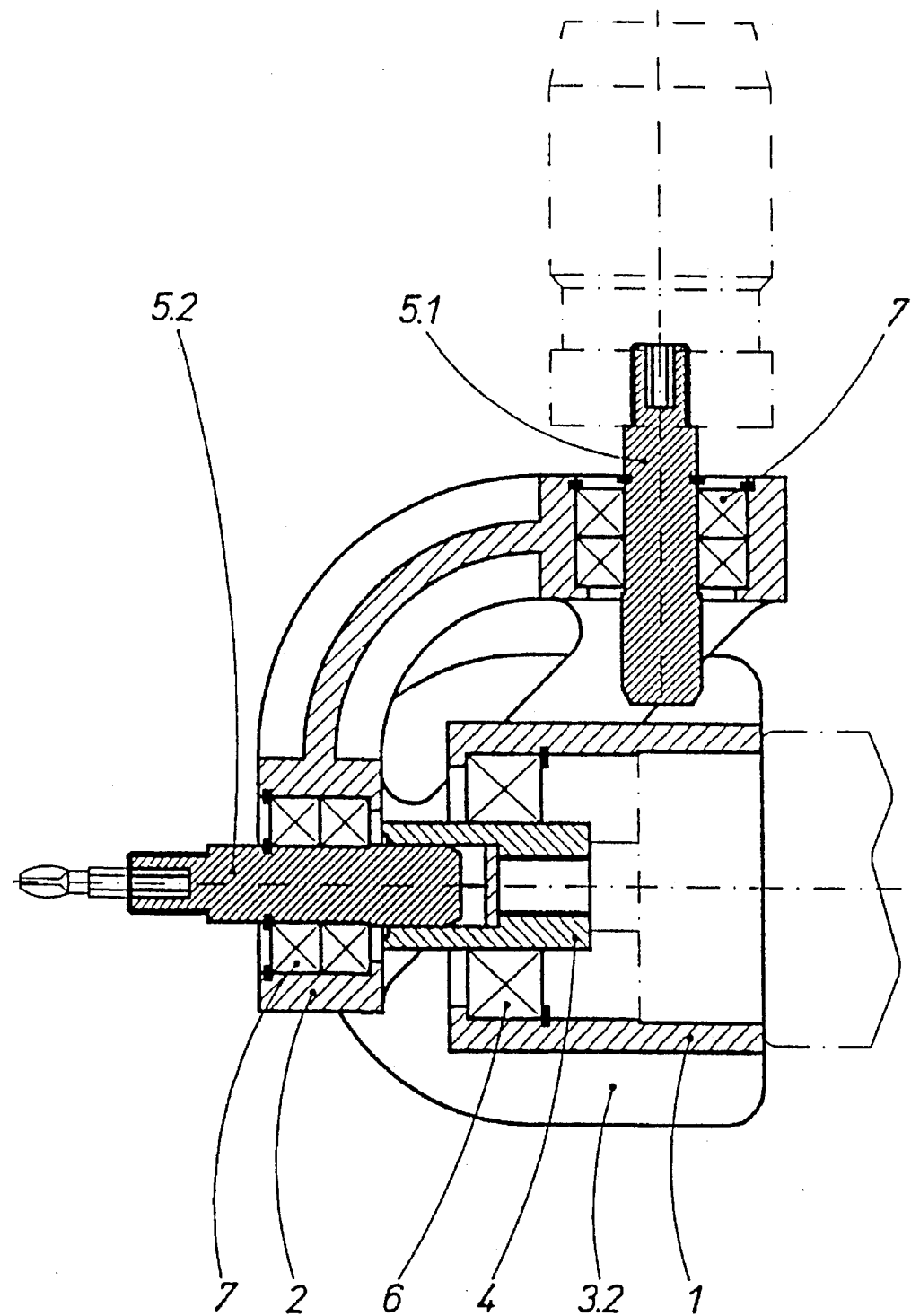
FIG. 5 is top plan sectional view of the swivel bearing corresponding to the operating position of FIG. 3.
Figure 6:
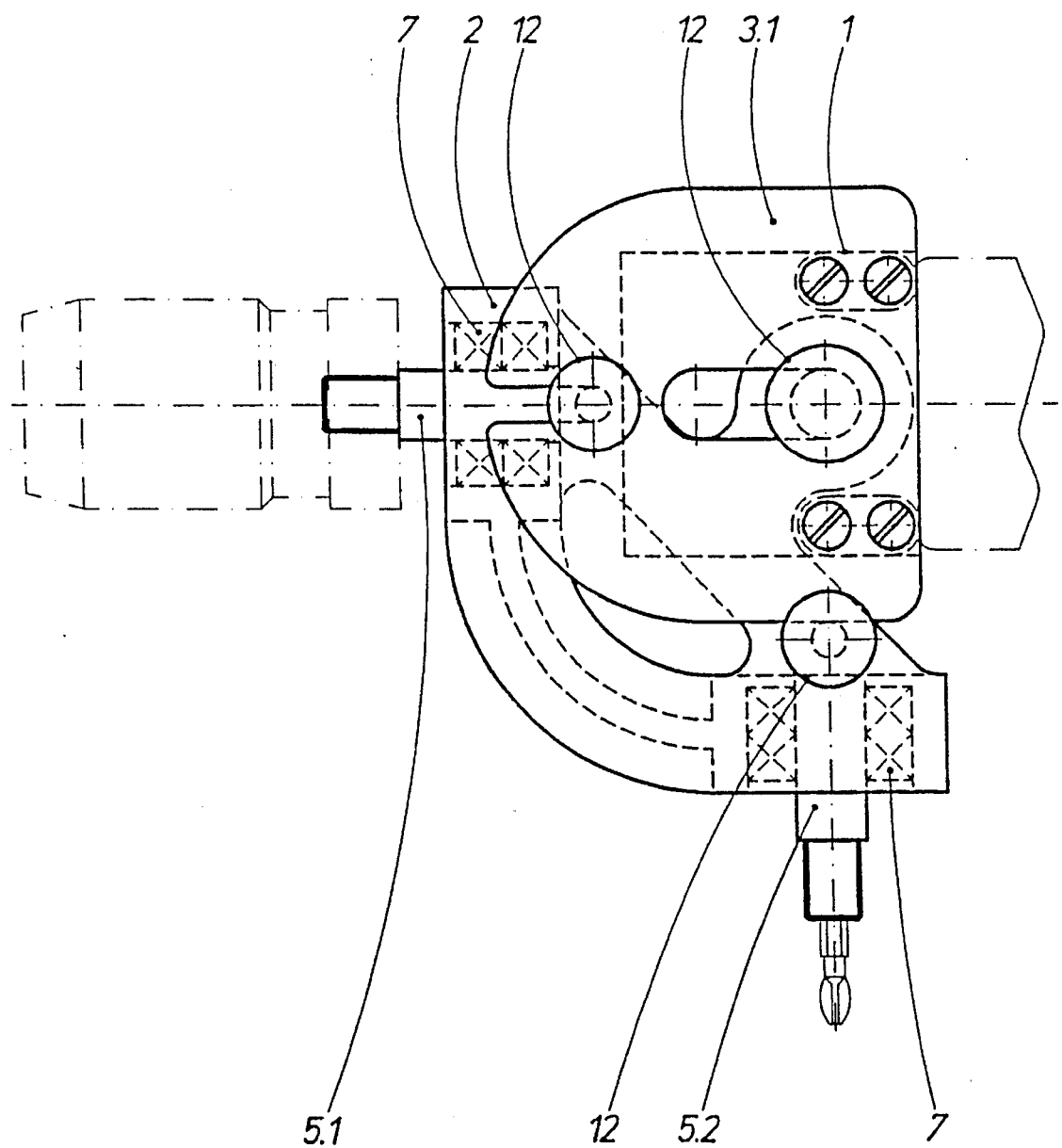
FIG. 6 is a top plan view of the dual tool-carrier corresponding to the operating position of FIG. 4.
Figure 7:
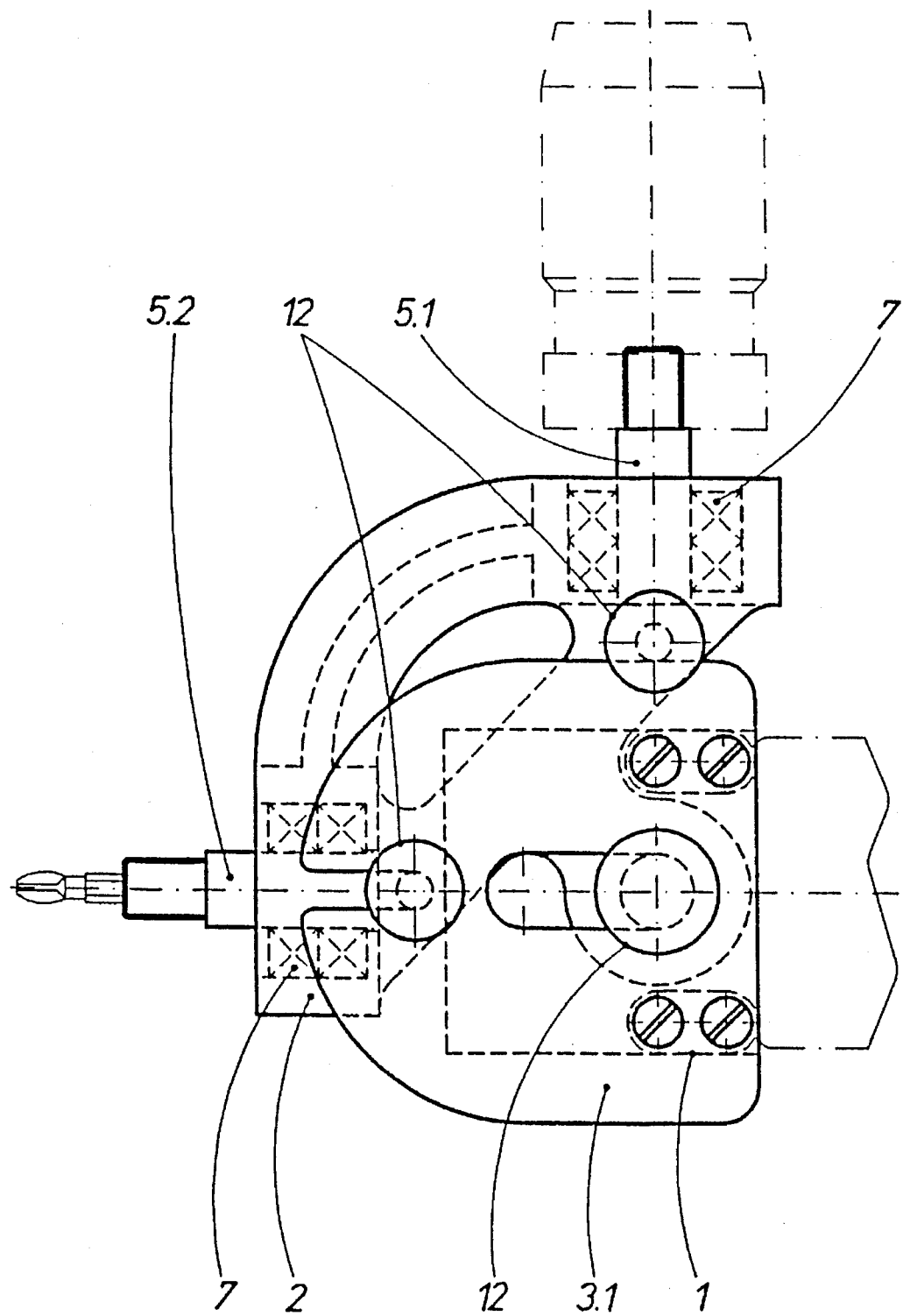
FIG. 7 is a top plan view of the tool-carrier in the operating position of FIG. 5.

FIGS. 4 and 5 illustrate section drawings of the swivel bearing viewed from above, whereby FIG. 4 corresponds to the operating position of FIG. 1 and FIG. 5 the operating position of FIG. 3. The reference characters in the drawings have been selected so that the same parts are designated with the same reference characters.

Corresponding to FIG. 4 and 5, FIGS. 6 and 7 illustrate top views of the dual toolcarrier in the two operating positions previously illustrated.

Figure 8:
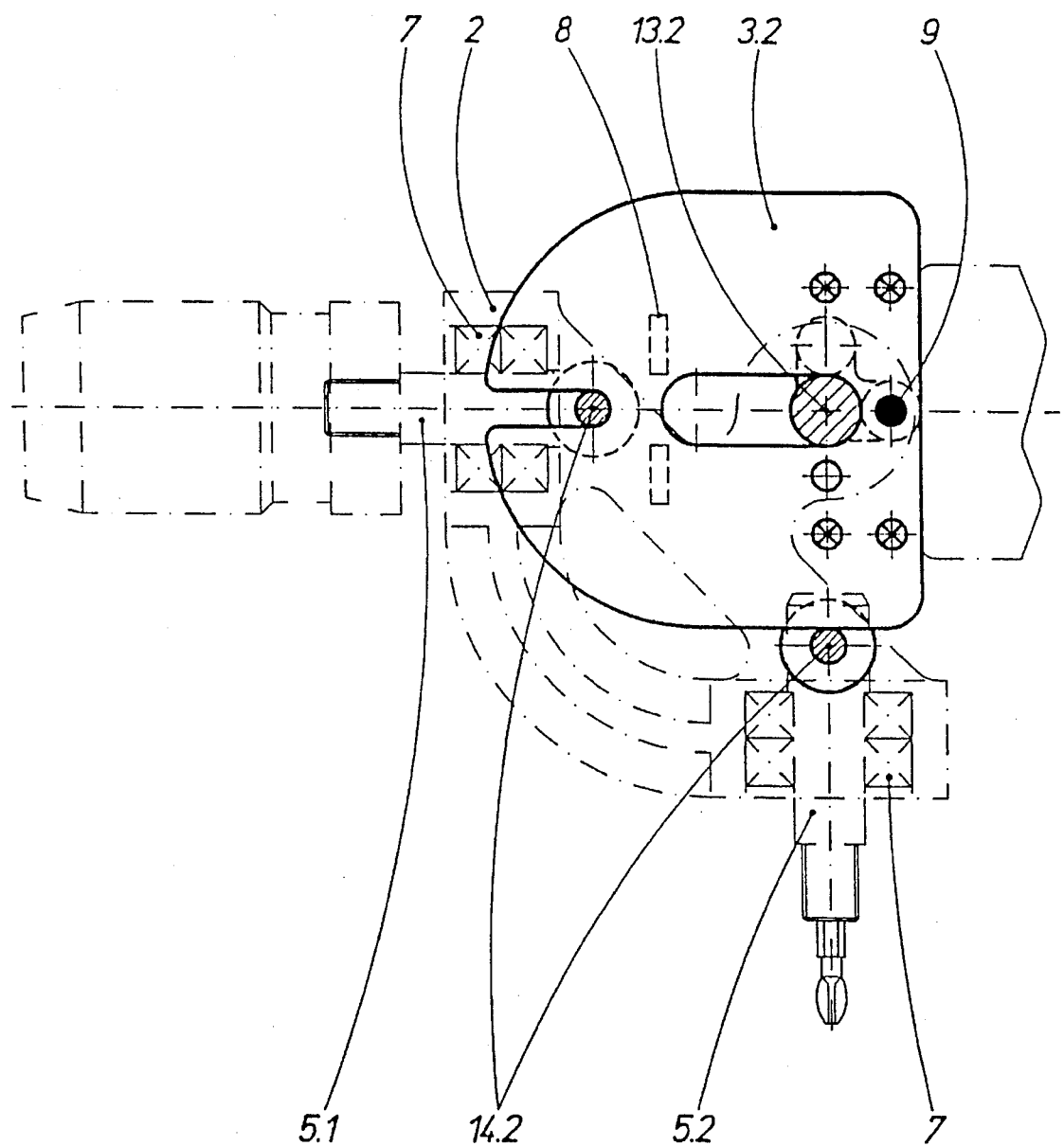
FIG. 8 is a top plan view demonstrating the transition of the swivel bearing from a third to a second operating position in which shaft 5.1 is ready for operation with its drill chuck attached.
Figure 9:
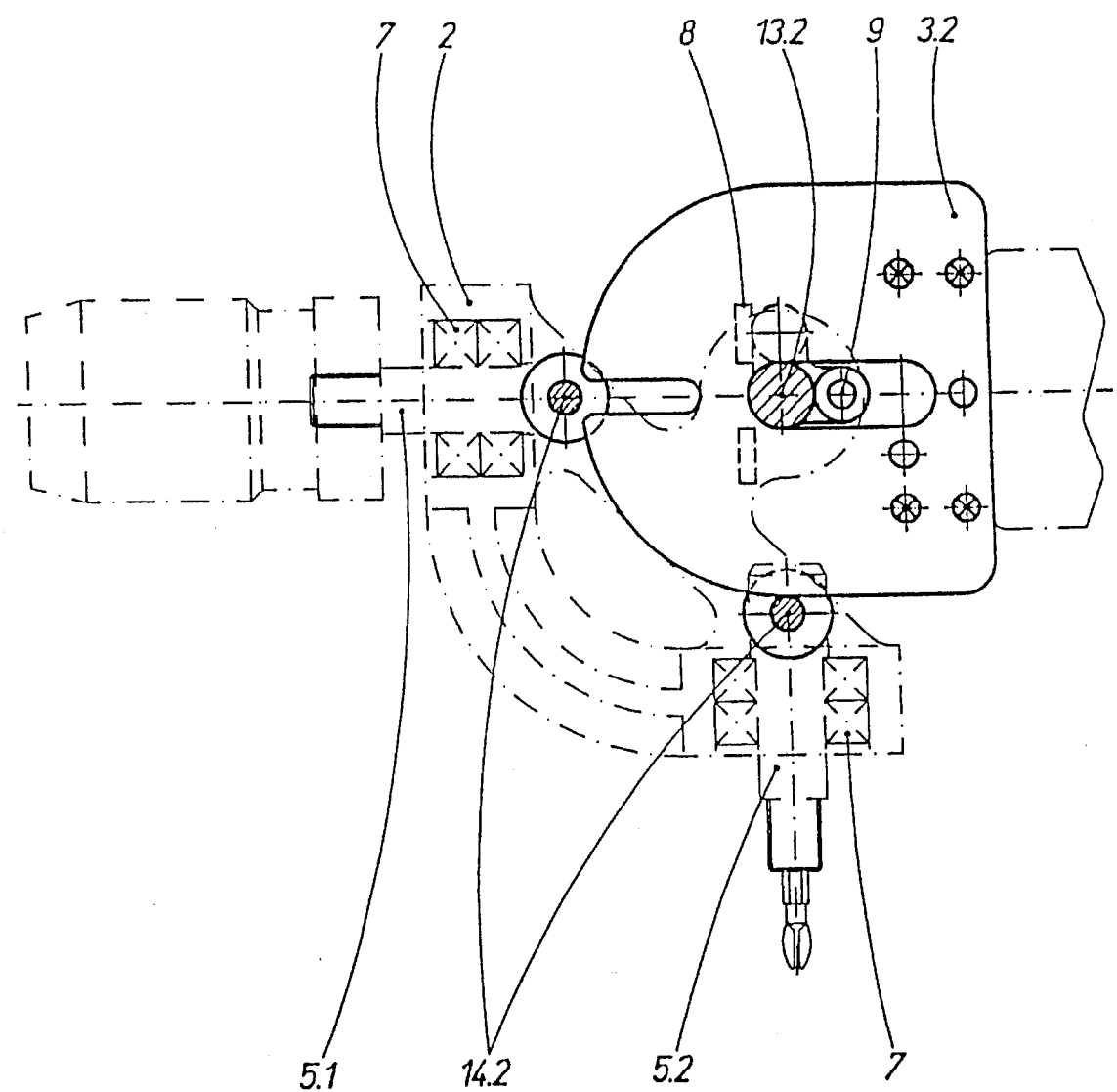
FIG. 9 is a top plan view similar to FIG. 8, showing, however, the swivel bearing moved forward.
Figure 10:
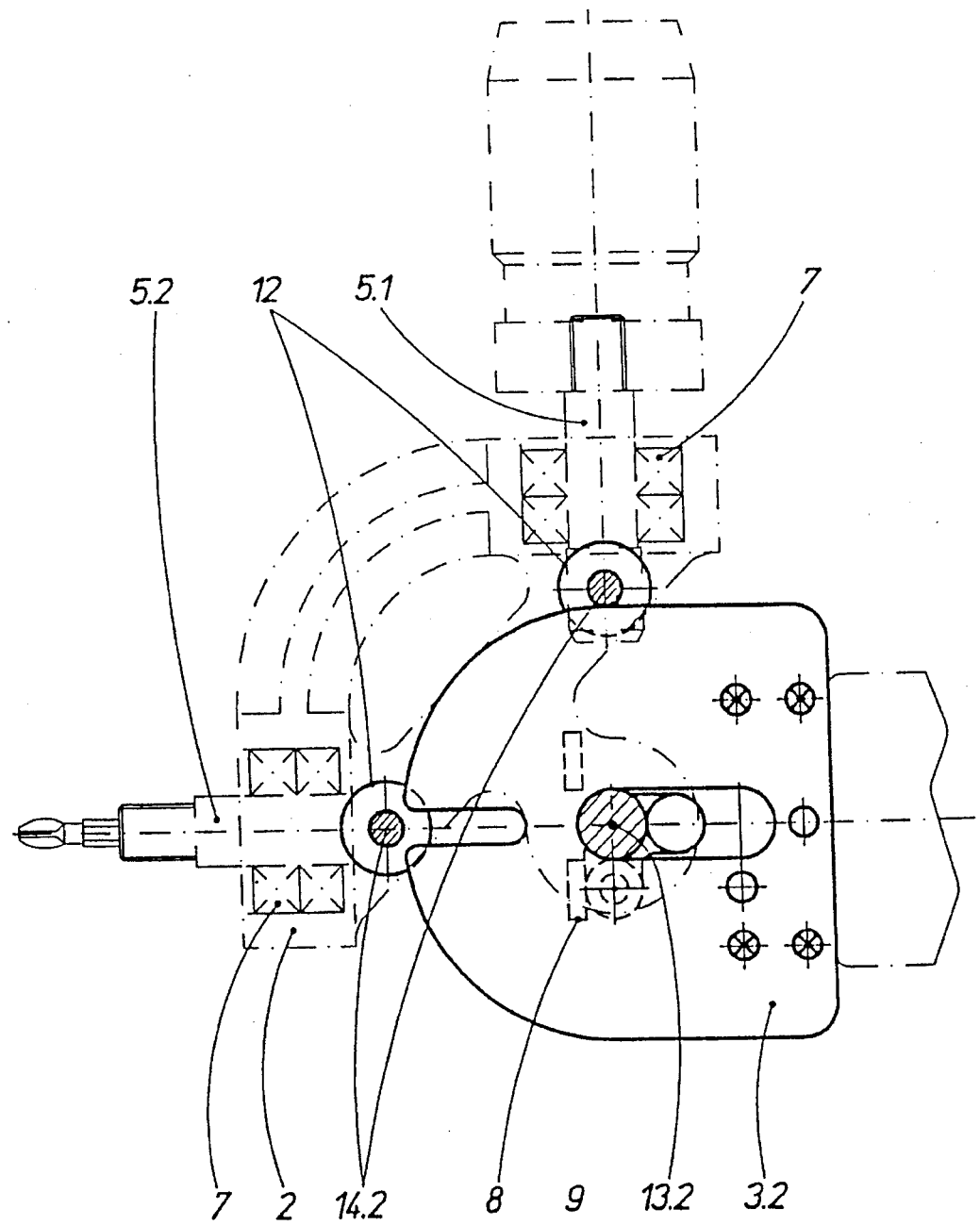
FIG. 10 is a top plan view illustrating the situation after the effected pivoting to the right, however, not yet connected.
Figure 11:
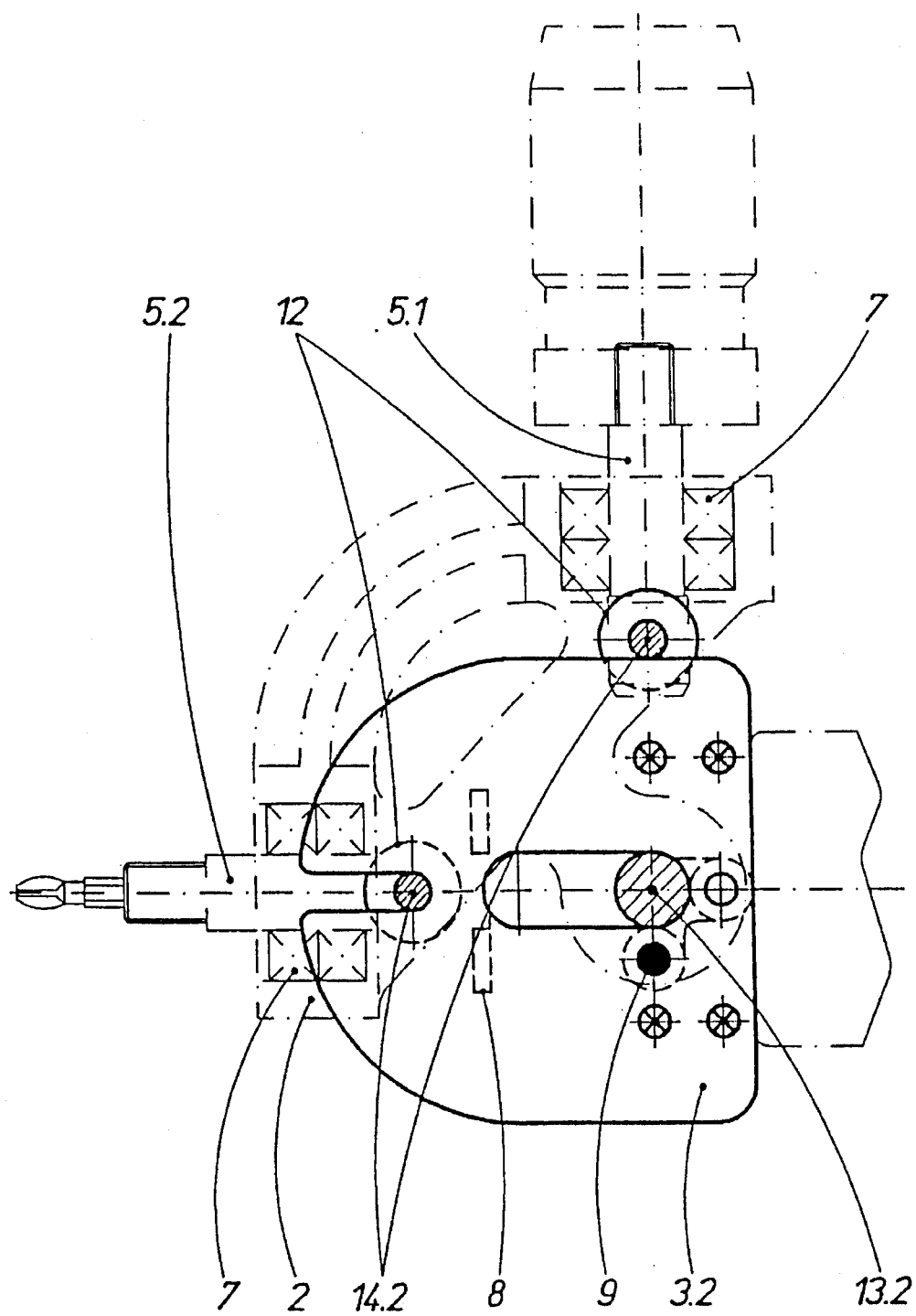
FIG. 11 is a top plan view illustrating the new operating position of the dual tool-carrier in which shaft 5.2 has been moved back.

FIGS. 8–11 clarify again the transition of the swivel bearing from a first to a second operating position whereby in the Figures the top view has been selected and in particular the lower coulisse 3.2 with the pins 13.2 and 14.2 is illustrated with a continuous line whereas the remainder of the dual tool-carrier is illustrated with a dotted line. FIG. 8 illustrates the first operating position in which shaft 5.1 is ready for operation with its drill chuck attached. The pins 14.2 and 13.2 are moved backwards into the cutouts of the coulisse and the plunging pin of the hand grip 9 engages. FIG. 9 shows the next situation. In this situation the swivel bearing is moved forwards until the pin 13.2 has reached the end of the sparing and pin 14.2 is moved out of the slot of the coulisse. The lower plate 3.2 is provided with a bar 8 which serves as stop and insertion help for the pin 14.2 and prevents an overturn. FIG. 10 illustrates the situation after the effected pivoting to the right however not yet connected. Pin 13.2 is still in the front position, whereas however shaft 5.1 is pivoted approximately 90° to the right and shaft 5.2 with the illustrated screw attachment is in the insert position in the driver 4. FIG. 11 finally illustrates the new operating position of the dual tool-carrier in which the shaft 5.2 with the screw attachment has been moved back and the plunging pin 9 of the hand grip is located engaged in a bore offset at 90° so that an unintentional axial pivoting of the swivel bearing is no longer possible and thus the operating situation is again produced.

In order to enable an unproblematic as possible handling and an unproblematic as possible change from one operating position to another, it is necessary to guarantee a coupling of driver 4 to the shaft 5.1 or 5.2 at all times, regardless of the relative rotation situation in which the two shafts are situated in relation to one another. This means an automatic engaging of shaft 5.1 or 5.2 into driver 4 must be guaranteed by a simple push back action. According to the invention this is effected by an embodiment of the driver and the shaft corresponding to FIGS. 12a and 12b.

Figure 12F:
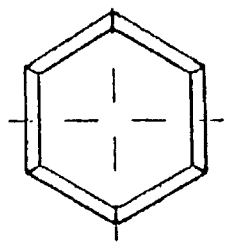
FIG. 12f is a top plan view of the insert bit.
Figure 12G:
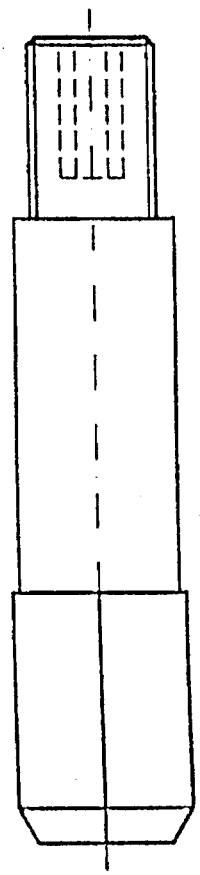
FIG. 12g is a front elevation view of the insert bit shown in FIG. 12f.
Figure 12H:
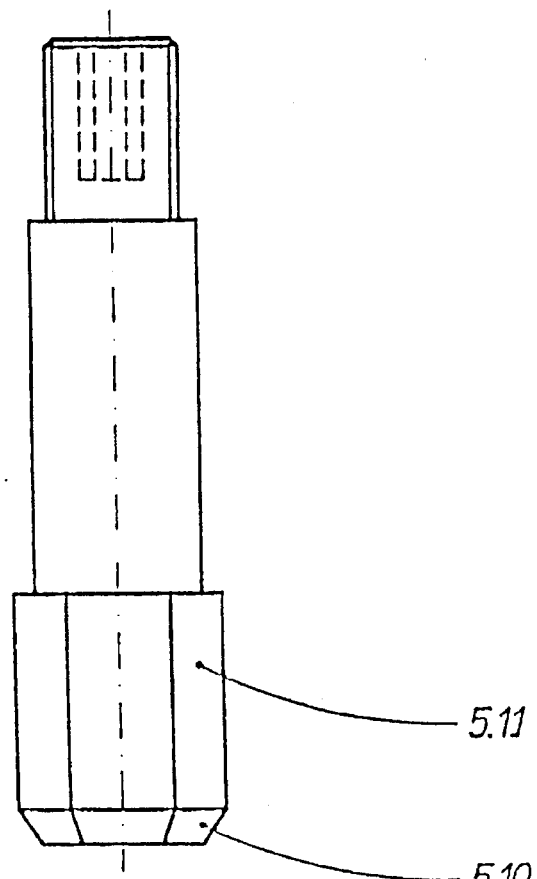
FIG. 12h is a side elevation view of the insert bit shown in FIG. 12f.

FIG. 12a illustrates the driver in various section situations whereby it is illustrated that the driver consists of a polyhedral socket, on the front side of said polyhedral socket each surface is cut V-shaped whereby an inverse polyhedral insert bit (shaft 5.1 or 5.2) rotates automatically into the correct position. FIG. 12b illustrates the chamfered hexagon insert bit corresponding to the invention which together with the polyhedral socket formed corresponding to the invention causes the desired automatic fit. The polyhedral insert bit can be seen in the top view with its views A and B below. The drawing illustrates clearly the flat chamfering at the end of the hexagon corresponding to the respective outer surfaces in the respective views.

Figure 13:
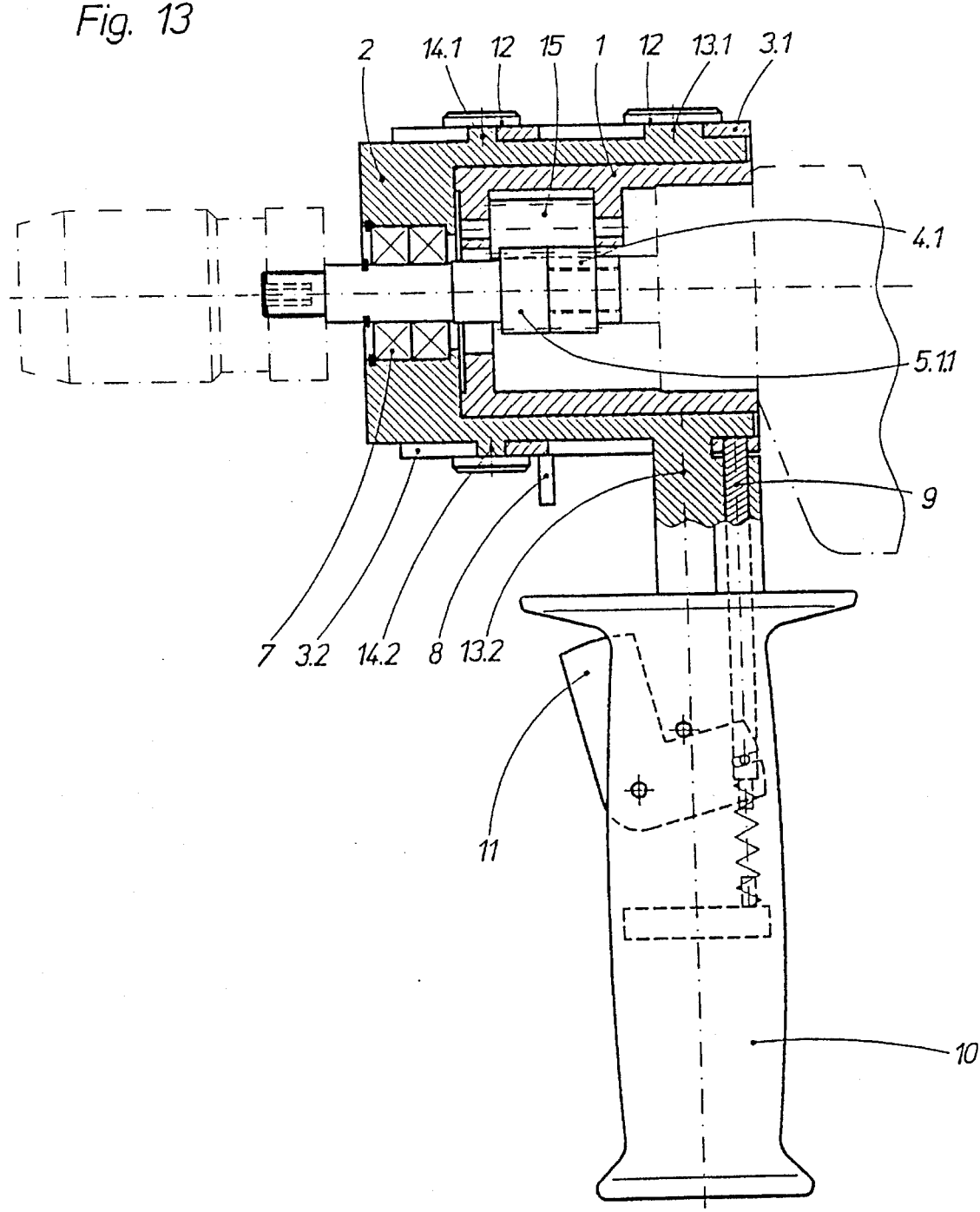
FIG. 13 is a side elevation view of a dual tool-carrier illustrating another embodiment of the invention corresponding to the view as shown in FIG. 1.
Figure 14:
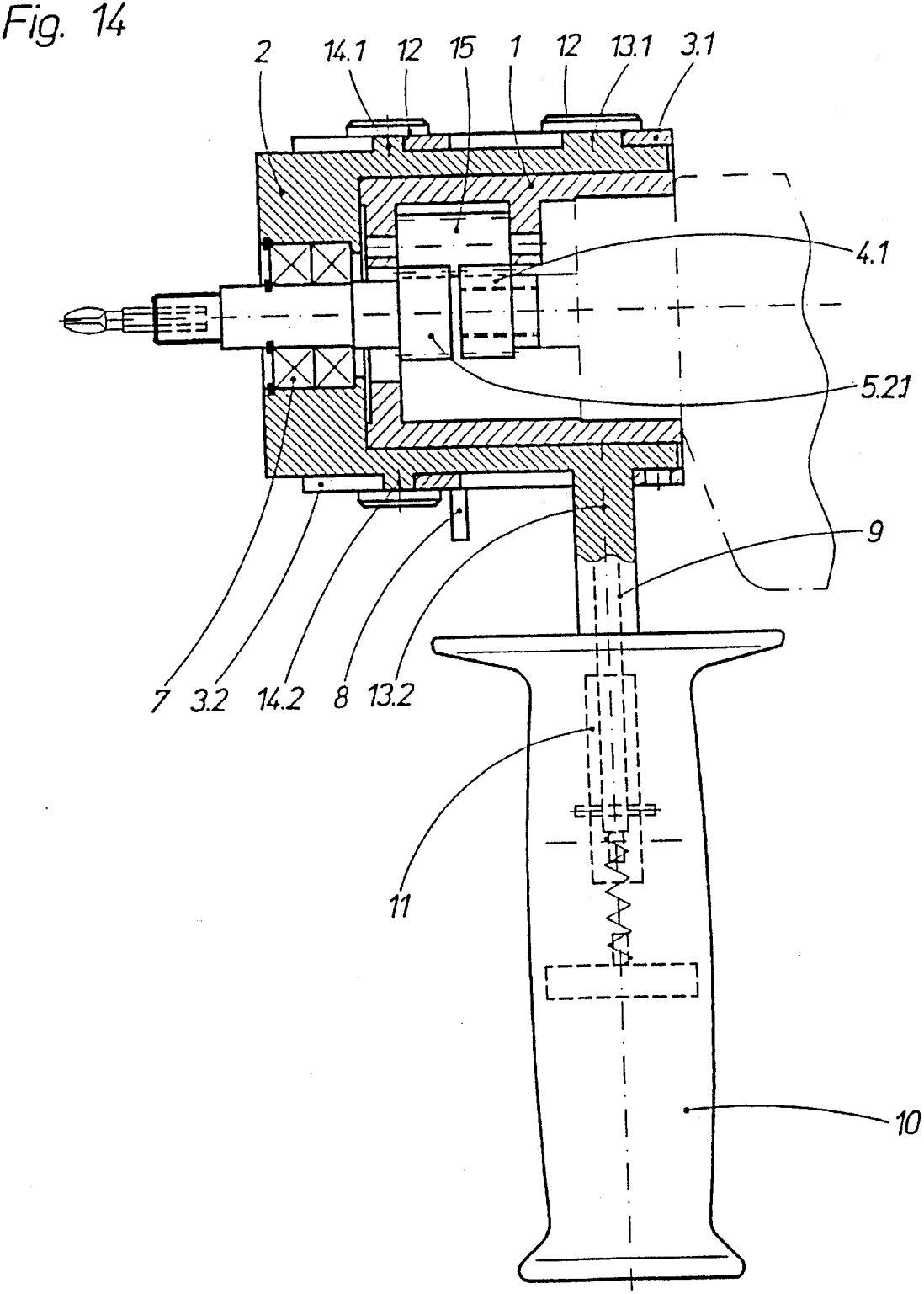
FIG. 14 is a side elevation view of a still further embodiment of the invention shown with a view similar to the one of FIG. 3.

FIGS. 13 and 14 illustrate another embodiment of the invention which has been described in FIGS. 1–11 whereby FIG. 13 corresponds to FIG. 1 and FIG. 14 corresponds to FIG. 3. The difference in the two embodiments lies therein that the transfer of torque between the driving and driven shafts takes place via a coupling spur gear. The drive shaft is provided with a spur gear 4.1 on its end whereas shaft 5.1 and 5.2 are provided with a spur gear 5.1.1 on the driven end. In the bell-shaped sleeve a further spur gear 15 is attached radially displaced to the drive shaft of the drill above the two spur gears 5.1.1 and 4.1 overlapping said spur gears and so supported that it drives the two spur gears 5.2.1 and 4.1 similar to a gear if the corresponding shaft is in the operating position.

FIG. 14 illustrates the same fixture as in FIG. 13 however in this case the shaft 5.2 is in the operating position. In this embodiment of the invention, with this shaft 5.2 the impact drilling attachment of the drill is not in force in that a gap provided between the two shaft ends of the driving shaft and the driven shaft.

FIGS. 15–20 illustrate a fixture corresponding to the previous Figures but simplified. With this adapter holder the axial movement possibility for coupling and decoupling the driving and driven shafts has been abandoned so that a rotation is only possible about the axis of rotation 13.1 and 13.2. The embodiment of the coupling of both shafts corresponds to FIGS. 13 and 14. In this case a coulisse as in the previous Figures could be abandoned. Due to the no longer available axial movement it is necessary to round off the spur gear front surface somewhat so that when pivoting the shafts into the operating position, especially the driven shaft 5.1 with the impact drill effect, a final thrust resistant connection occurs.

Figure 15:
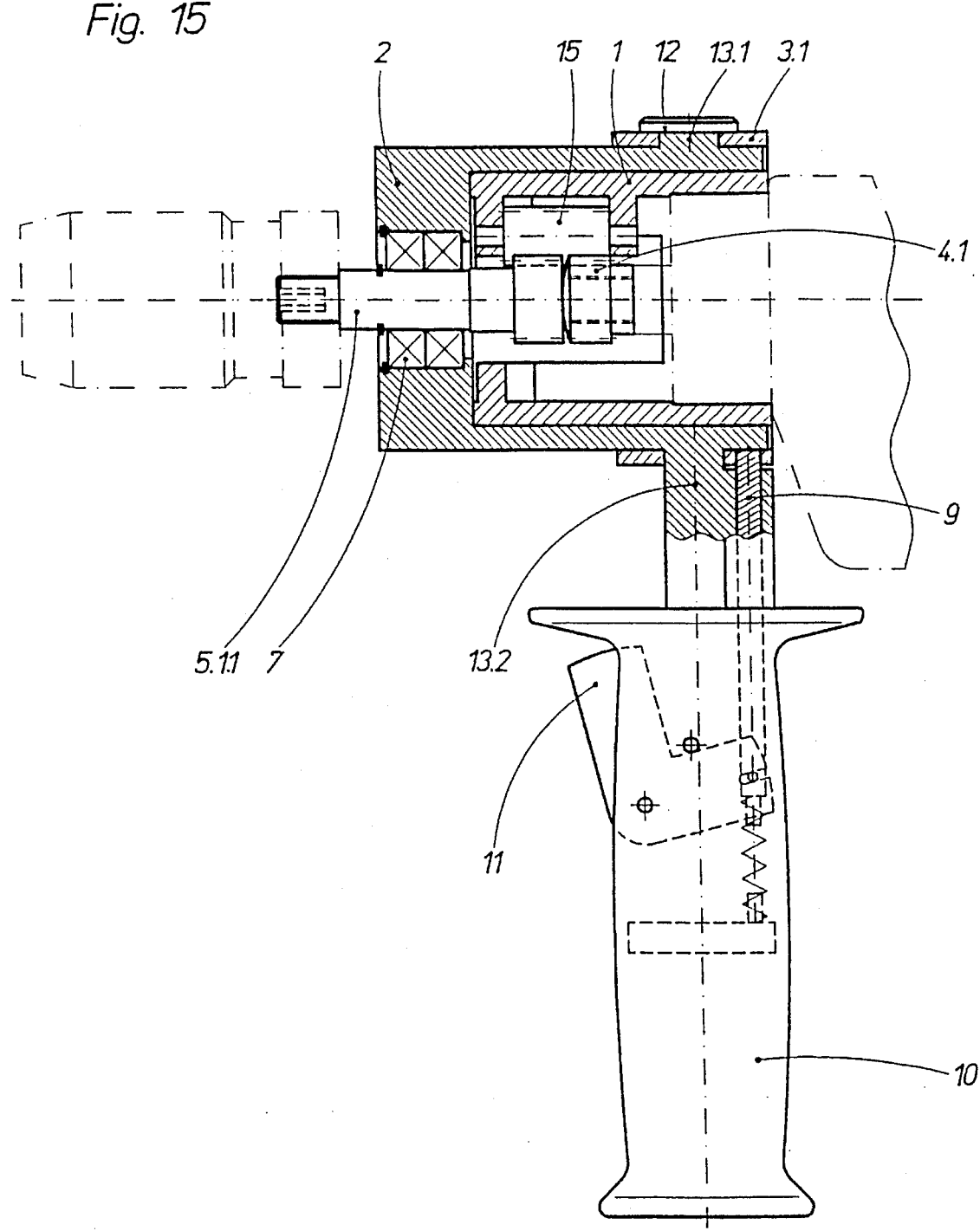
FIG. 15 is a side elevation view of a still further embodiment of the invention corresponding to the view of FIG. 1 comprising an adapter holder.
Figure 16:
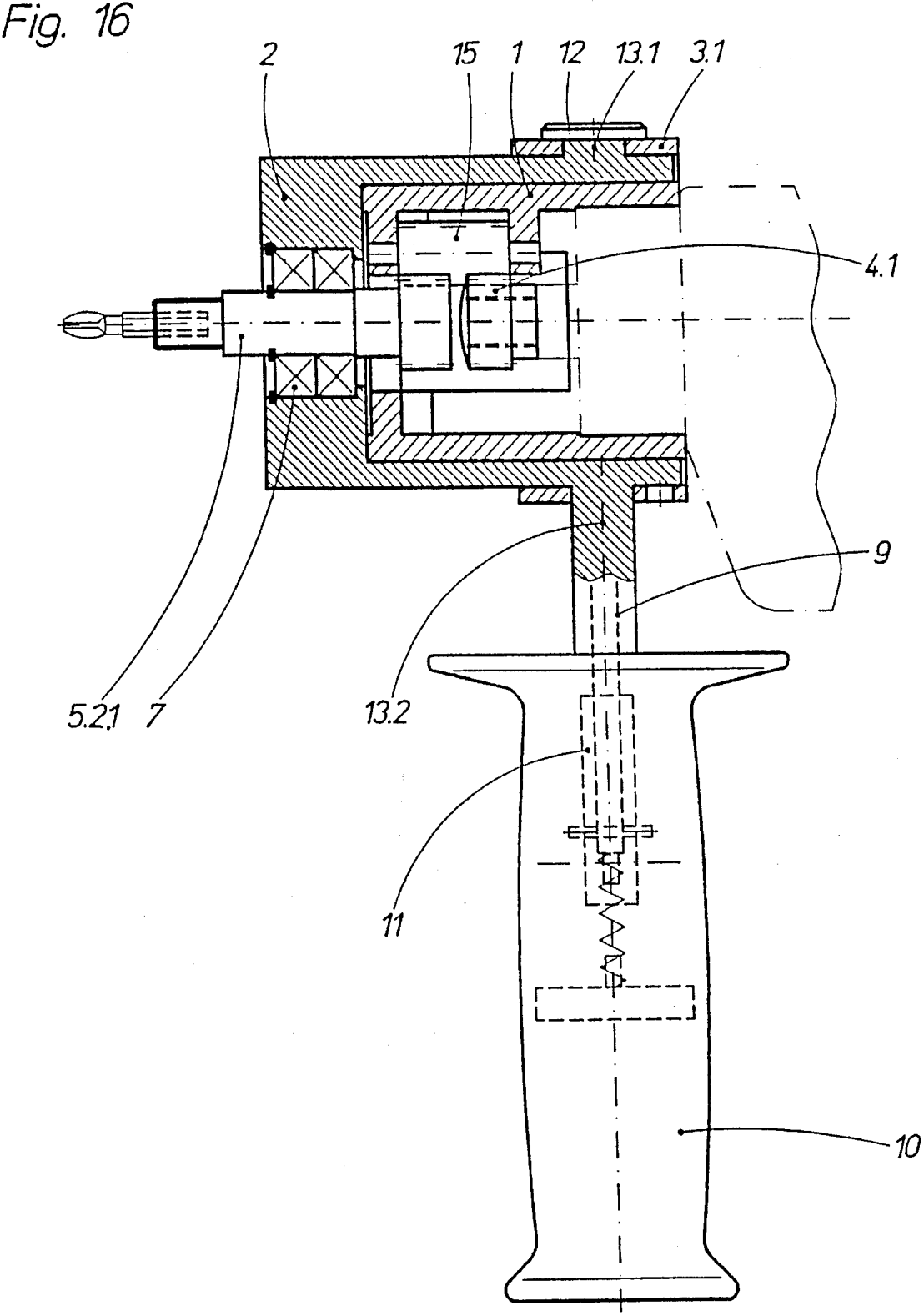
FIG. 16 is a side elevation view similar to the view of FIG. 3 with an adapter holder.
Figure 17:
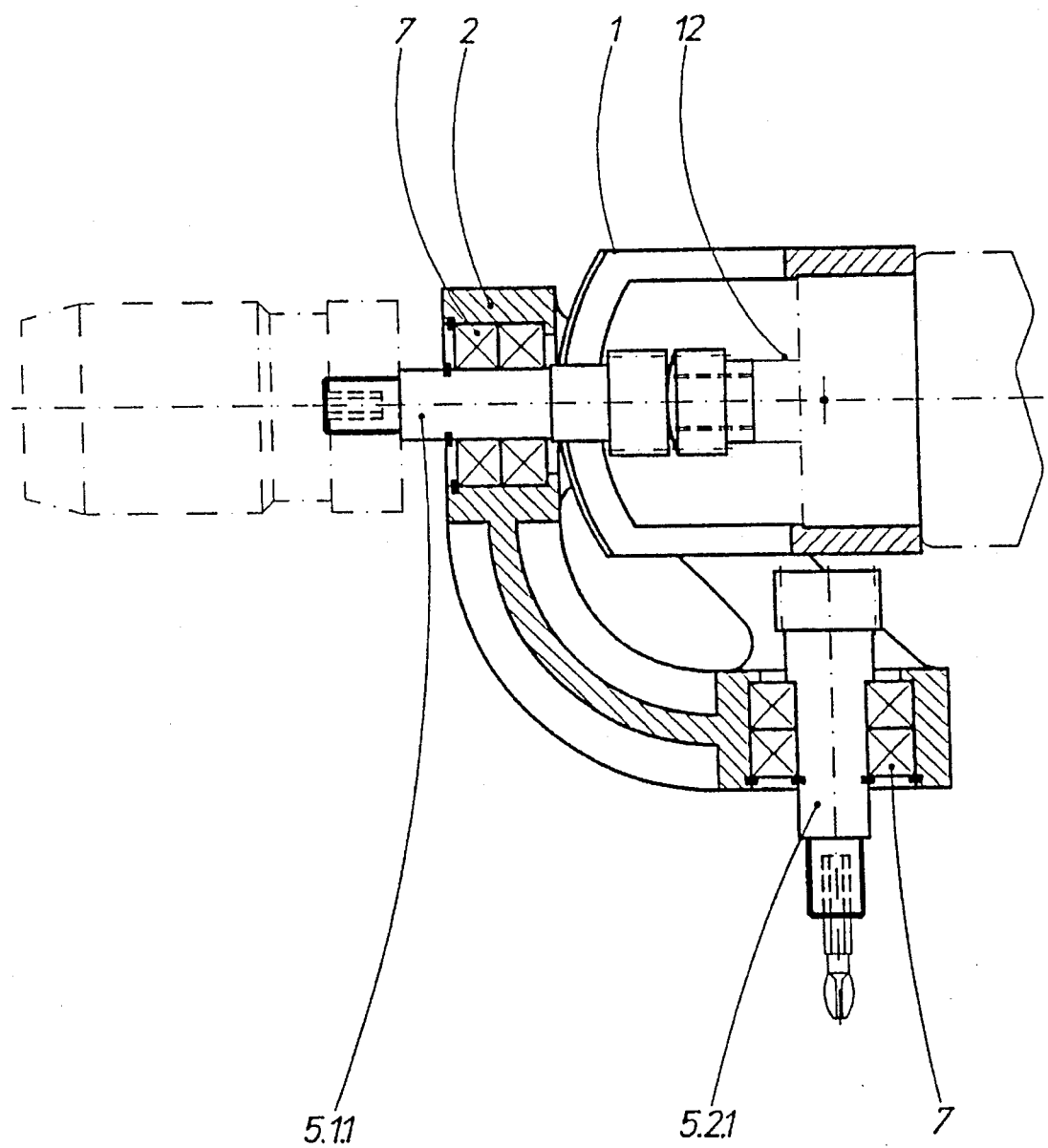
FIG. 17 is a horizontal sectional view through the working position illustrated in FIG. 15.
Figure 18:
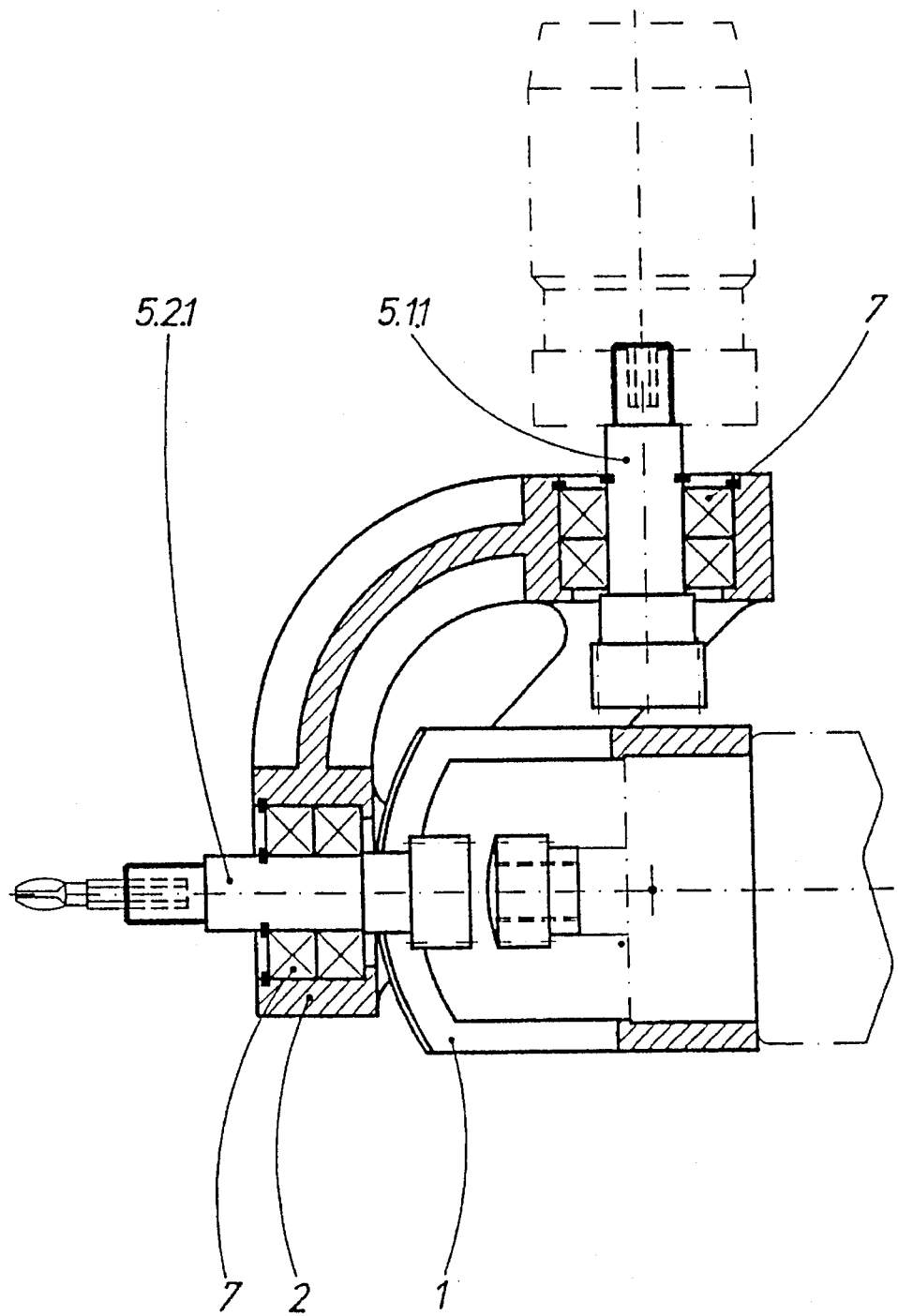
FIG. 18 is a horizontal sectional view in the working position illustrated in FIG. 16.
Figure 19:
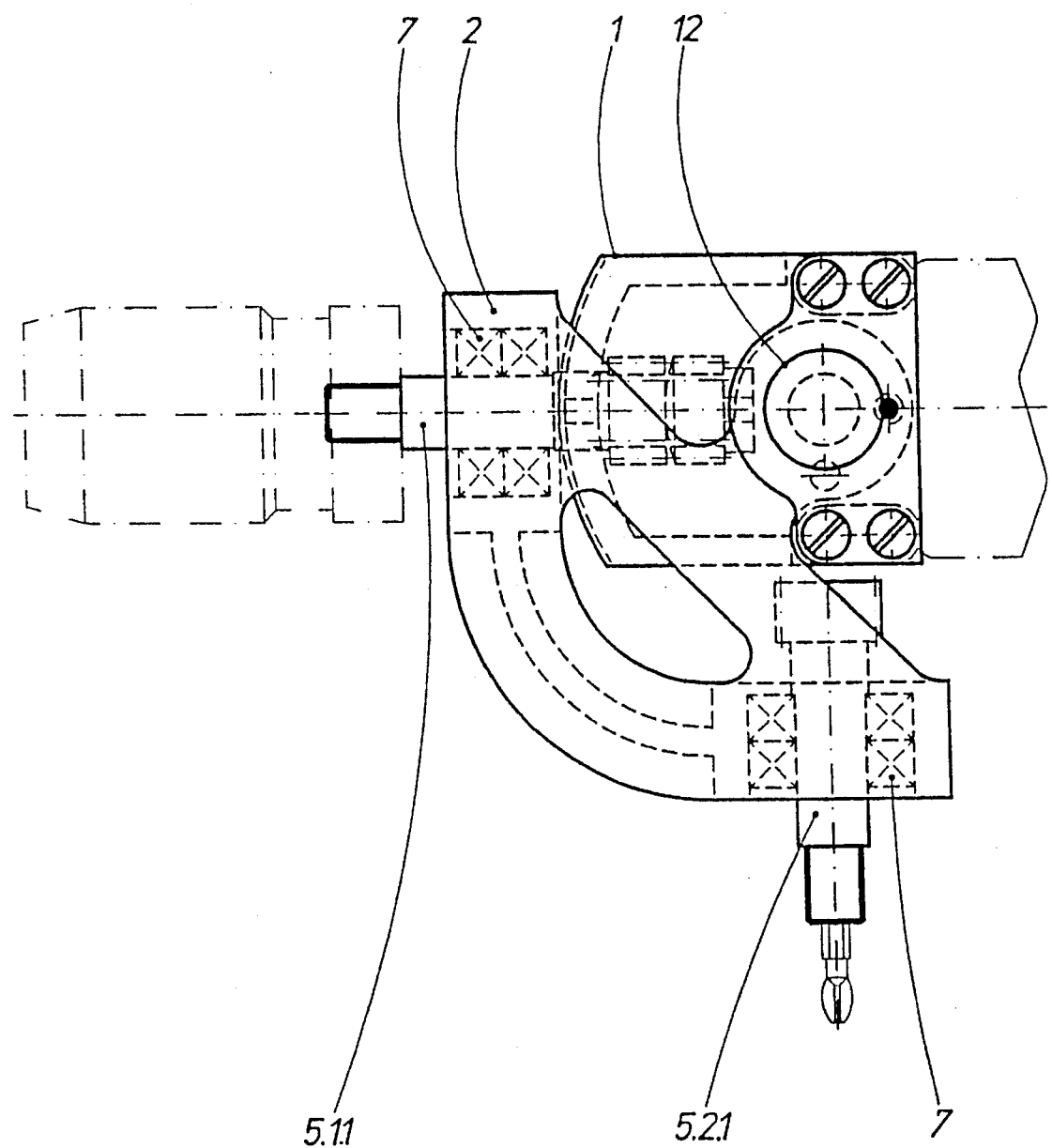
FIG. 19 is a top plan view in one working position.
Figure 20:
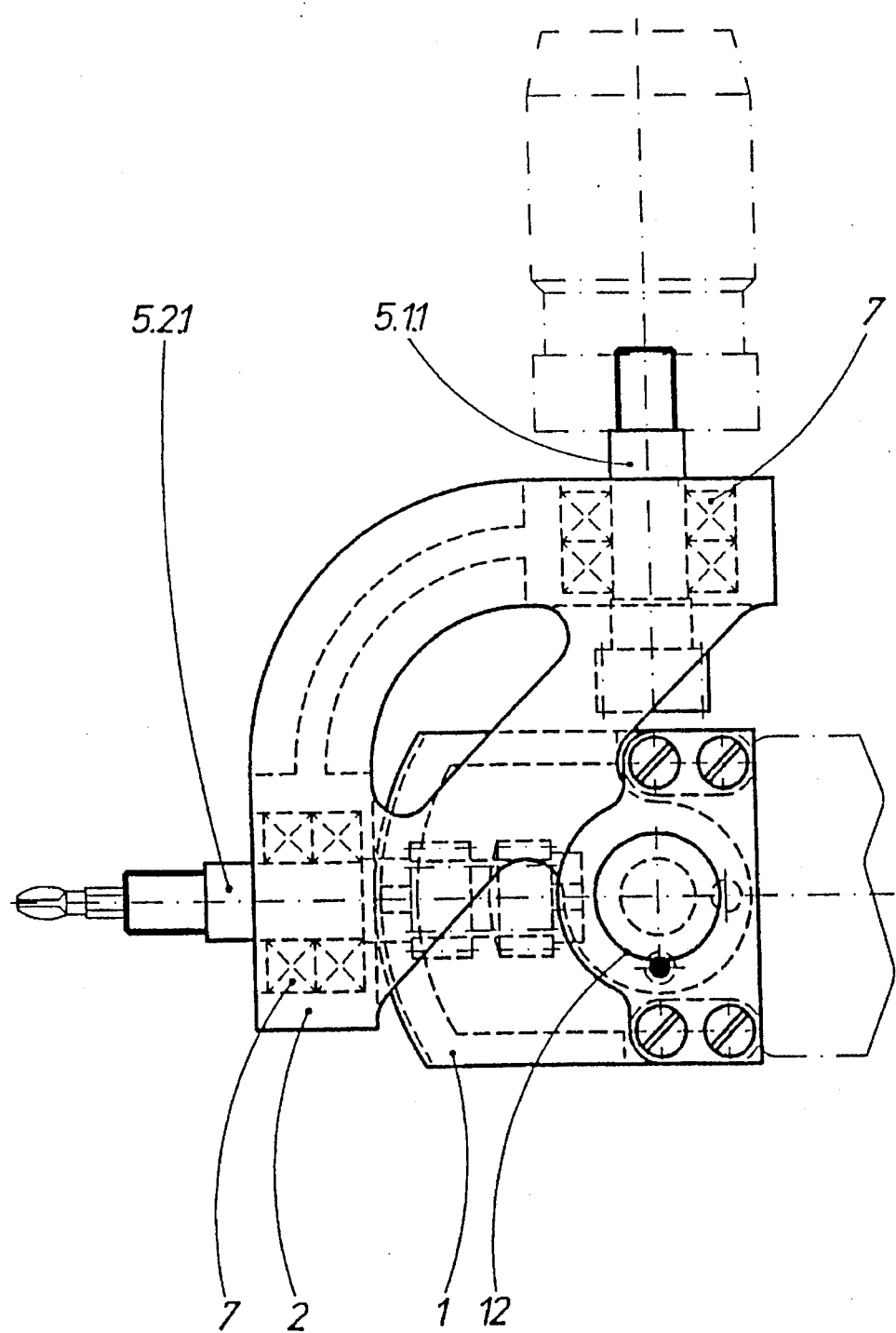
FIG. 20 is a top plan view in a second working position.

FIGS. 15 and 16 correspond to the views of FIGS. 1 and 3 whereas FIGS. 17 and 18 illustrate a horizontal sectional drawing through the working positions illustrated in FIGS. 15 and 16, whereby the FIGS. 19 and 20 illustrate a corresponding top view. Particularly in the top view it can be seen that with this embodiment no coulisse is used to bring the two driven shafts to their operating position but that due to a simple swivelling of the dual holder about an axis the desired exchange of the driven shafts in operation is achieved.

We claim:

1. Dual tool-carrier for hand drills with the following features:

two shafts are provided each for mounting one tool;

the shafts form an angle with one another which swivels the tool not being used out of the working area;

a fixture is provided, said fixture frictionally connects alternately the shafts with the driving shaft of the drill;

wherein the improvement comprises:

the shafts and the driving shafts of the drill form a plane;

the two shafts are provided and can be rotated about an axis vertical to said plane;

a driver is provided connected to the driving shaft fixed in their rotational movement;

a bell-shaped sleeve is provided, said bell-shaped sleeve is firmly connected to the machine housing;

a swivel bearing is provided driven by the bellshaped sleeve;

the two shafts are supported in the swivel bearing;

at least one coulisse guide is provided for the swivel bearing, said coulisse bearing guides the swivel movement of the swivel bearing so that the respective shaft in the operating position is connected to the drive fixed in their rotational movement; and, a mechanical catch is provided, said catch prevents unintentional swivelling of the swivel bearing.

2. Dual tool-carrier according to claim 1, wherein for the load transmission from driving shaft to shaft in operating position;

the driver is designed as spur gear;

the shafts of the dual tool-carrier are each provided with a spur gear at their rear end; and to transfer the driving power to the shaft a spur gear is provided, said spur gear couples the driving shaft with the respective shaft in operating position.

3. Dual tool-carrier according to claim 2, wherein the driver has a polyhedral socket;

the driver shows for each edge a V-shaped notch towards its open side;

the shaft to be driven by the driver has on its connecting length to the driver a corresponding polyhedral insert bit;

each surface of the polyhedral insert bit has a flat chamfering on its end which is inserted in the driver.

4. Dual tool-carrier according to claim 1 wherein the coulisse guide is formed so that for decoupling and coupling of shaft and driver before the swivel movement a movement in axial direction is executed.

5. Dual tool-carrier according to claim 1 wherein an additional hand grip is provided on the swivel bearing to swivel said swivel bearing.

6. Dual tool-carrier according to claim 1 wherein the mechanical catch fixture is provided integrated in the hand grip.

7. Dual tool-carrier according to claim 1 wherein the bearing of at least one shaft shows play in axial direction so that the impact effect of an impact drilling machine can be transferred.

8. Dual tool-carrier according to claim 1 wherein the connection between shaft and driving shaft fixed in their rotational movement for at least one shaft has axial play at least as great as the stroke of an impact drill whereby the corresponding shaft is supported in the absence of axial play.

* * * * *

UNITED STATES PATENT AND TRADEMARK OFFICE
CERTIFICATE OF CORRECTION

PATENT NO.  : 5,573,358
DATED       : November 12, 1996
INVENTOR(S) : Walter Gobbers It is certified that error appears in the above-identified patent and that said Letters Patent is hereby corrected as shown below:

Col. 1, line 26, change "carder" to --carrier--;

Col. 3, line 28, change "3a" to --3 a--;

Col. 3, line 52, change "toolcarrier" to --tool-carrier--;

Col. 4, line 38, change "1-11whereby" to --1-11 whereby--;

Col. 4, line 57, change "20illustrate" to --20 illustrate--;

Claim 1, line 32, change "bellshaped" to --bell-shaped--.

Signed and Sealed this

Eighteenth Day of February, 1997

Attest:

BRUCE LEHMAN

*Attesting Officer*  *Commissioner of Patents and Trademarks*